June 28, 1966   C. RACZYNSKI   3,258,176
PNEUMATIC GLUE DISPENSER
Filed Sept. 24, 1964
FIG. 1
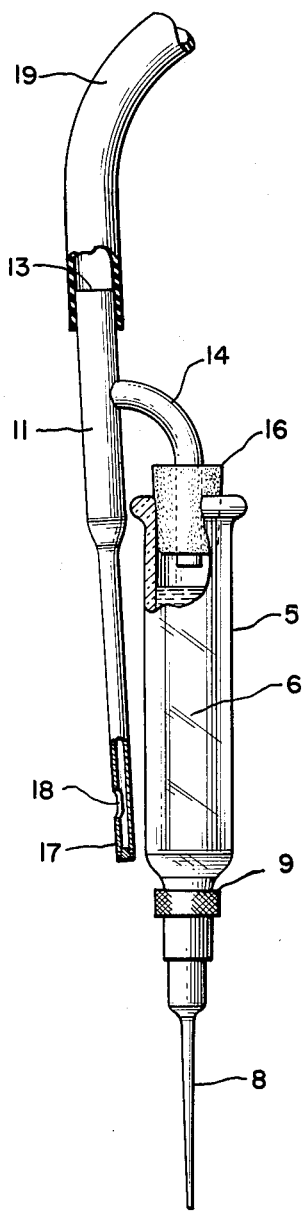
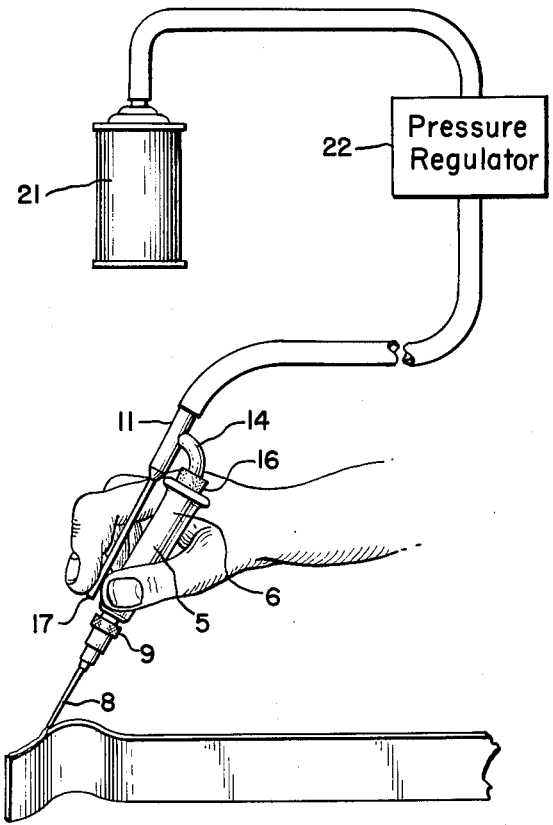
FIG. 2
INVENTOR.
Chester Raczynski
BY
Atty.

United States Patent Office 3,258,176
Patented June 28, 1966

3,258,176
PNEUMATIC GLUE DISPENSER
Chester Raczynski, Chicago, Ill., assignor to Zenith Radio Corporation, Chicago, Ill., a corporation of Delaware
Filed Sept. 24, 1964, Ser. No. 398,920
3 Claims. (Cl. 222—397)

This invention relates generally to apparatus for dispensing fluids, and more particularly, to a novel hand-held, pneumatic dispenser for glues and the like.

In dispensing various fluids, such as glues, it is usually desirable to precisely control the rate of fluid flow and to be able to almost instantaneously initiate or stop this flow. Of course, it is further desirable, especially on an assembly line gluing operation, that the apparatus be of simple, lightweight construction and allow of accurate guiding and positioning simultaneously with the initiation or termination of fluid flow. Of course, these objectives should preferably be attained with a minimum amount of physical movement and skill on the part of the operator.

The above recited features are a practical necessity when gluing plastic parts, such as models, hearing aid cases, etc., having small mating sections with a polystyrene or similar cement. In this application, both the amount of glue and its distribution are critical as many plastics are soluble in these cements, and thus, an error in the cementing operation will ruin the part.

Fluid dispensers having their flow rate controlled by thumb or hand pressure are usually of simple and economical construction, but the substantial pressure required for dispensing and the accompanying awkward manner of gripping the device makes it difficult for the operator to accurately guide the apparatus. In addition, the use of hand pressure usually provides an uneven and erratic flow rate resulting in an unsightly, and possible unreliable, gluing operation. For the most part, the advent of pneumatic dispensers has allowed precise control of the dispensing rate by the use of carefully regulated air compressors or the like. However, most prior art pneumatic dispensers still suffer from one or more disadvantages. For instance, the pistol type of dispenser often requires considerable "trigger" pressure for actuation of fluid flow and furthermore it has been found quite awkward, especially for the novice, to accurately position and guide a dispenser of this type.

It is therefore an object of this invention to provide new and improved apparatus for the dispensing of fluids.

It is a further object of this invention to provide a novel fluid dispenser of simple and economical construction.

It is still a further object of the present invention to provide a glue dispenser which allows substantially instantaneous on-off fluid flow control without materially interfering with the guiding and positioning of the apparatus during the dispensing operation.

Another object of the invention is to provide apparatus having on-off flow control of the aforesaid character while allowing convenient and accurate guiding of the apparatus, even for the unexperienced operator.

Accordingly, the invention is directed to hand-held pneumatic apparatus utilizing a gas pressure source for dispensing a fluid at a controlled rate comprising means defining an elongated reservoir for the fluid and terminating at its lower end in a needle orifice and including means comprising a hollow member having an opening at its upper end and coupled to the reservoir means at a position located above the fluid contained therein. The apparatus is further equipped with a pressurized gas inlet line coupled to the pressure source and to the opening and adapted to form a closed pressurized system including the hollow member and reservoir during operation of the apparatus. A second opening located in the hollow member means serves as an outlet for the pressurized gas from the chamber, the second opening being further adapted to be covered by the index finger during operation without substantial pressure in the normal grasping of the apparatus between the thumb and index finger to facilitate the convenient simultaneous guiding of the apparatus and dispensing of the fluid at a precise rate proportional to the predetermined pressure exerted by the gas.

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

FIGURE 1 is a side elevation, partly in section, illustrating the structural details of a novel pneumatic dispensing apparatus embodying the invention; and FIGURE 2 is a sketch illustrating actual use of the dispenser of FIGURE 1.

With reference to FIGURE 1 the apparatus shown therein comprises a means 5 defining an elongated reservoir for a fluid 6 terminating at its lower end in a needle orifice 8, which for reasons to be discussed, is preferably detachable from the body of the reservoir, as at 9. The physical size of container 5 is such as to provide a sufficient fluid reserve, but as will presently become apparent reservoir 5 is preferably of a size which is comfortably held within the hand. The diameter of the opening within needle-like orifice 8 is, of course, defined by such factors as the viscosity of the fluid 6 and the desired flow rate.

A first hollow member 11 having an opening 13 at its upper end is rigidly coupled by a second hollow member 14 to reservoir 5. For convenience, member 14 is fitted within a cylindrical aperture in a rubberized cork 16 which in turn is designed to snugly fit within the upper portion of the reservoir, substantially as shown. Hollow member 11 also extends in a downward direction toward needle orifice 8 and has a closed terminal stub portion 17 preferably oriented substantially parallel to the reservoir.

A flexible and lightweight pressurized gas inlet line 19 is adapted to receive the upper portion including opening 13 of member 11. Members 14, 11 and reservoir 5 cooperate to form, during operation, a pressurized system under the influence of the gas from line 19.

A second small dish-shaped opening 18 located along stub portion 17 of member 11 serves as an outlet for the pressurized gas from the aforesaid chamber. Opening 18 is adapted to be covered without substantial pressure by the index finger of the operator in the normal grasping of the apparatus. In accordance with the invention, this also facilitates the convenient, simultaneous guiding and positioning of the apparatus and dispensing of the fluid at a precise rate proportional to the pressure exerted by the gas. Of course, it is understood that the location of opening 18, and the length or even the provision of a separate member 11 as shown are not to be restrictive of the inventive concept. For instance, although not preferred, opening 18 may be located along container 5 at any convenient position above the liquid held therein.

As shown in FIGURE 1, the portion of gas inlet line 19 opposite member 11 is coupled to an aerosol type pressurized can 21. An air pressure source of this type offers portability and is convenient for use in the home, as by children in model building. Of course, in a factory or similar place more sophisticated apparatus may be employed. If desired or needed, a pressure regulator 22 may be interposed between line 19 and source 21.

The operation of the dispensing apparatus of the invention may be best understood by reference to FIGURE 2. As illustrated, the apparatus is held in the manner of a pen with member 11 being positioned so that the index finger of the holder rests comfortably adjacent or covering opening 18 in the normal grasping of the structure. The operator to initiate or terminate the dispensing of the fluid need only move the end portion of his index finger by a slight amount which motion clearly does not disrupt his ability to guide the flow from orifice 8. In addition, with fluids or glues of normally encountered viscosity, the gas pressure required for dispensing is such that the covering of opening 18 by the index finger of the operator only requires a pressure incident to proper grasping of the device. Also, although the pressure derived from unit 21 is adjusted to provide an optimum flow rate from orifice 8, the operator by only partially covering opening 18 may reduce the flow rate to perform finishing touches, etc. Thus, the dispenser of the invention can display unusual sensitivity and in cooperation with the convenient pen-like manner in which the apparatus is adapted to be grasped, it is possible even for the relatively inexperienced operator to steadily guide the flow from orifice 8 and achieve precise control of the flow rate.

Also as is apparent from both of the drawings, the novel dispensing apparatus of the invention is of an extremely simple and economical construction. Finally, the apparatus is quite easy to disassemble and clean or refill as members 5, 8 and 5, 16 are only frictionally engaged and may be removed by a firm pressure.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. Hand-held pneumatic apparatus utilizing a gas pressure source for dispensing a fluid at a controlled rate, comprising:

means defining an elongated reservoir for said fluid and terminating at its lower end in a needle orifice;

hollow member means having an opening at its upper end and coupled to said reservoir means at a position located above the fluid contained therein;

a pressurized gas inlet line coupled to said pressure source and to said opening and adapted to form during operation of said apparatus a closed pressurized system including said member and said reservoir;

and a second opening located in said hollow member means to serve as an outlet for said pressurized gas from said system, said second opening adapted to be covered without substantial pressure by the index finger in the normal grasping of the apparatus between the thumb and index finger during operation thereof to facilitate the convenient, simultaneous guiding of said apparatus and dispensing of said fluid through said needle orifice at a precise rate proportional to the predetermined pressure exerted by said gas.

2. Hand-held pneumatic apparatus utilizing a gas pressure source for dispensing a fluid at a controlled rate, comprising:

means defining an elongated reservoir for said fluid and terminating at its lower end in a needle orifice;

a first hollow member having an opening at its upper end and rigidly coupled by a second hollow member to said reservoir means at a position located above the fluid contained therein, said first member also extending in a downward direction toward said needle orifice and having a terminal stub portion spaced from and oriented substantially parallel to said reservoir means;

a flexible pressurized gas inlet line coupled to said pressure source and to said opening and adapted to form during operation of said apparatus a closed pressurized system with said members and said reservoir;

and a second opening located along said stub portion of said first member to serve as an outlet for said pressurized gas from said system, said second opening adapted to be covered by the index finger during operation without substantial pressure in the normal grasping of the apparatus to facilitate the convenient, simultaneous guiding of said apparatus and dispensing of said fluid through said needle orifice at a precise rate proportional to the predetermined pressure exerted by said gas.

3. Hand-held pneumatic apparatus for dispensing a fluid at a controlled rate, comprising:

means defining an elongated reservoir for said fluid and terminating at its lower end in a needle orifice;

a first hollow member having an opening at its upper end and rigidly coupled by a second hollow member to said reservoir means at a position located above the fluid contained therein, said first member also extending in a downward direction toward said needle orifice and having a terminal stub portion spaced from and oriented substantially parallel to said reservoir means;

an aerosol type pressurized gas container coupled to said opening and adapted to form during operation of said apparatus a closed pressurized system with said members and said reservoir;

and a second opening located along said stub portion of said first member to serve as an outlet for said pressurized gas from said system, said second opening adapted to be covered by the index finger during operation without substantial pressure in the normal grasping of the apparatus to facilitate the convenient, simultaneous guiding of said apparatus and dispensing of said fluid through said needle orifice at a precise rate proportional to the predetermined pressure exerted by said gas.

References Cited by the Examiner

FOREIGN PATENTS 695,793  10/1930  France.
542,058  1/1932  Germany.

RAPHAEL M. LUPO, *Primary Examiner.*
LOUIS J. DEMBO, *Examiner.*
N. L. STACK, *Assistant Examiner.*